United States Patent [19]

Nakajima et al.

[11] Patent Number: 4,527,045
[45] Date of Patent: Jul. 2, 1985

[54] CONTROL APPARATUS FOR AN ARC WELDER

[75] Inventors: Jun Nakajima, Chiba; Takeshi Araya, Ibaraki; Tadashi Aso, Kanagawa; Kiyoshi Kawamata, Ebina; Kinji Sugimoto, Yokohama, all of Japan

[73] Assignee: Hitachi Seiko Ltd., Tokyo, Japan

[21] Appl. No.: 244,676

[22] Filed: Mar. 17, 1981

[30] Foreign Application Priority Data

Mar. 17, 1980 [JP] Japan ................................ 55-33630
May 6, 1980 [JP] Japan ................................ 55-59610
May 16, 1980 [JP] Japan ................................ 55-65089

[51] Int. Cl.³ .............................................. B23K 9/10
[52] U.S. Cl. ...................... 219/130.31; 219/130.21; 219/130.33; 219/137.71; 323/241
[58] Field of Search .......... 219/137 PS, 130.5, 130.21, 219/130.31, 130.32, 130.33, 137.71, 124.34, 125.11, 125.12; 323/235, 241, 322

[56] References Cited

U.S. PATENT DOCUMENTS 3,213,262 10/1965 Marchand .................... 219/137.71
3,735,241 5/1973 O'Sullivan ...................... 323/241
4,093,844 6/1978 Fellure et al. ................. 219/130.21
4,163,886 8/1979 Omae et al. ................... 219/125.11
4,247,751 1/1981 Ashton et al. ................. 219/137.71
4,247,752 1/1981 Stringer ........................ 219/130.33
4,302,655 11/1981 Edling .......................... 219/125.12

FOREIGN PATENT DOCUMENTS 2741728 3/1979 Fed. Rep. of Germany ...................... 219/124.34
48-40182 11/1973 Japan .

OTHER PUBLICATIONS

A. J. Weissberger, "Microprocessors Simplify Industrial Control", *Electronic Design 22*, 10/25/1975, pp. 96–99.
A. F. Manz, "The One Knob Welder", *Welding Journal*, 9/1968, pp. 720–725.

*Primary Examiner*—Clifford C. Shaw
*Attorney, Agent, or Firm*—Antonelli, Terry & Wands

[57] ABSTRACT

An arc welder is provided with a phase control circuit by rectifying elements to simplify the construction of the arc welder and improve the performance and operability. The arc welder is further provided with a storage control circuit to enable the retrieval of stored data of the same welding conditions. A union/individual control circuit is provided to eliminate troublesome adjustment of potentiometers.

18 Claims, 19 Drawing Figures

CONTROL APPARATUS FOR AN ARC WELDER

BACKGROUND OF THE INVENTION

The present invention relates to an arc welder and more particularly, the present invention firstly relates to a rectifier phase control type arc welder and more specifically to an arc welder which can fully contribute to the reduction of the number of components of a welder control circuit and a manufacturing cost thereof, the enhancement of performance of the welder, operability on a part of users and the feasibility of change of functions.

Secondly, the present invention relates to an arc welder in which welding condition setting signals determined in a welding process are stored and they are subsequently read out selectively to carry out the welding process.

Thirdly, the present invention relates to an arc welder in which an output voltage or an arc voltage and a welding current are controlled in unison or individually, and in the in-unison control mode an optimum output voltage or arc voltage and welding current relationship is continuously maintained to attain stable welding.

Regarding the first point, a prior art D.C. arc welder of the SCR firing phase control type has a disadvantage that the number of components of the control circuit is large. For example, the firing phase control circuits are provided one for each of the SCR's. Accordingly, it is troublesome to determine whether desired conditions are met. In addition, since it is based on analog control, automation of production of the circuits such as by IC circuits or LSI circuits is hard to attain and a manufacturing cost is high. From the view points of change of functions of the welding sequence and the enhancement of performance, the prior art system which is based on the analog control is not easy to change design or, if not impossible, a problem of price is encountered. Moreover, the circuits are utilized in the welding environment and are, therefore, subject to damage from, for example, heat generated during welding. The prior art system also did not provide sufficient protection with respect to the damage of the control circuit due to malfunctions of the control components.

Regarding the second point, it has been difficult in the past to determine the welding conditions suited for a particular article to be welded in known welding methods such as arc welding or resistor welding, and a considerable level of knowledge and experience were needed. For example, in a semi-automatic gas shield arc welding in which a consumable electrode is continuously fed to attain high efficiency welding, a welding current and a welding voltage are specifically determined by the experience and knowledge of a welding operator although general conditions of process are known for particular objects to be welded. Accordingly, it is difficult for an unexperienced operator to carry out the welding process. Furthermore, where the process is carried out under at least two process conditions, control elements for one process condition, which has once been met properly, has to be changed in order to meet the other process condition, and the conditions must be checked for their properness by a test arc whenever the conditions are changed. Even where a single process condition is used, if a control element such as a potentiometer is moved inadvertently, the original proper condition is lost.

In addition, the control element is preset to a position which is expected to meet the desired process condition, but whether it is a proper position or not is determined only after a welding power has been actually fed. In other words, whether the presetting is proper or not cannot be determined until welding occurs. Furthermore, since the adjustment is carried out using marking such as a scale or digits on a control panel of the control element, precision of setting is poor and the adjustment is difficult to attain. In the apparatus such as the semi-automatic gas shield arc welder described above in which the welding process conditions are determined by setting the welding voltage and the feed rate of the consumable electrode, if the process is started without having exactly set the control elements, a hole is formed in the article to be welded, defect beads are formed, or the welder is damaged or the lifetime thereof is shortened.

To resolve the above problems, it has been proposed to automate the setting of the welding conditions which were set in the past by the operator for each of the welding processes. In one proposed method, initial condition setting signals for welding and event signals (such as actual welding voltage and welding current) desired from the welding process carried out in accordance with the initial conditions are stored in storage means, and when the next welding process is to be initiated the initial condition setting signals are read from the storage means to start the welding process based on those signals, and after a predetermined time period has elapsed, the event signals are read from the storage means which are then used as the welding condition signals and the process are controlled to meet those conditions. (See Japanese Patent Publication No. 40182/73). However, in many cases, whether the settings are proper or not cannot be determined until after the welding process has actually been carried out, and the preset conditions are usually modified during the welding process. Accordingly, where the initial condition setting signals and the event signals stored are subsequently used on the assumption that they are correct, proper welding may not be attained. In addition, since the event signals in the welding period are all to be stored, a large capacity of storage means is required, and read and write operations to the storage means have to take place almost continuously.

Finally, regarding the third point discussed above, the prior art union/individual control circuit comprises a group of resistors. In order to generate an exact SCR firing reference voltage $V_{BV}$ for an arc voltage for a particular wire diameter based on an SCR firing reference voltage $V_{BM}$ of a wire feeding motor in the union control mode, high precision resistors are needed. However, the characteristics of the resistors change by temperature change which temperature changs are prevalant in a welding environment. Therefore, high precision is not attained in the union control mode. In addition, a compensation circuit for voltage fluctuation is not satisfactory although it is provided. A relation between the welding current and the welding voltage is non-linear and it is difficult to develop a proper relation by resistors. Furthermore, since the resistors are needed one for each of the wires of different diameters, the number of components is large, and the adjustment and the test for the potentiometers when the welder is shipped are troublesome. The operability is also poor.

SUMMARY OF THE INVENTION

It is an object of the present invention to provide an arc welder having a control circuit which has a reduced number of components, is simple in construction and is highly reliable.

It is another object of the present invention to provide an arc welder which can repetitively carry out the same desired process conditions, can carry out the welding process with proper process conditions and has a condition storage circuit which does not need a large capacity of storage means.

It is still another object of the present invention to provide an arc welder having a high precision and highly stable union/individual control circuit which does not need the adjustment and the testng of resistors.

The arc welder in accordance with the first mentioned object of the present invention is characterized by an SCR circuit responsive to an A.C. voltage input to regulate an arc welder power supply, a first detection circuit for detecting an output level of the arc welder power supply, a second detection circuit for detecting a predetermined point on a waveform of the A.C. voltage, a setting circuit for presetting the output level of the arc welder power supply, and a control circuit for receiving the outputs of the first detection circuit and the setting circuit each time when the second detection circuit detects the predetermined point on the A.C. voltage waveform to calculate firing timing of an SCR and count timing pulses to produce an SCR control signal when the count reaches the firing timing.

The arc welder in accordance with the mentioned object of the present invention is characterized by welding condition setting means, control circuit means for detecting and feeding back a welding output to control the welding output with a target value determined by condition setting signals derived from the welding condition setting means, storage means for storing one or more proper condition setting signals determined by the welding condition setting means, and storage signal readout circuit means for reading out the storage signals in the storage means to establish those signals as the target value in place of the condition setting signal determined by the welding condition setting means.

The arc welder in accordance with the third mentioned object of the present invention is characterized by storage means for previously storing one or more optimum relations between an arc voltage or an SCR output voltage (hereinafter represented by arc voltage) and a welding current or a rotation speed of a wire feeding motor (hereinafter represented by welding current), and control means for reading from the storage means an optimum value of one of the arc voltage and the welding current based on the other to control the welding current and the arc voltage.

DESCRIPTION OF THE PREFERRED EMBODIMENTS

Figure 1:
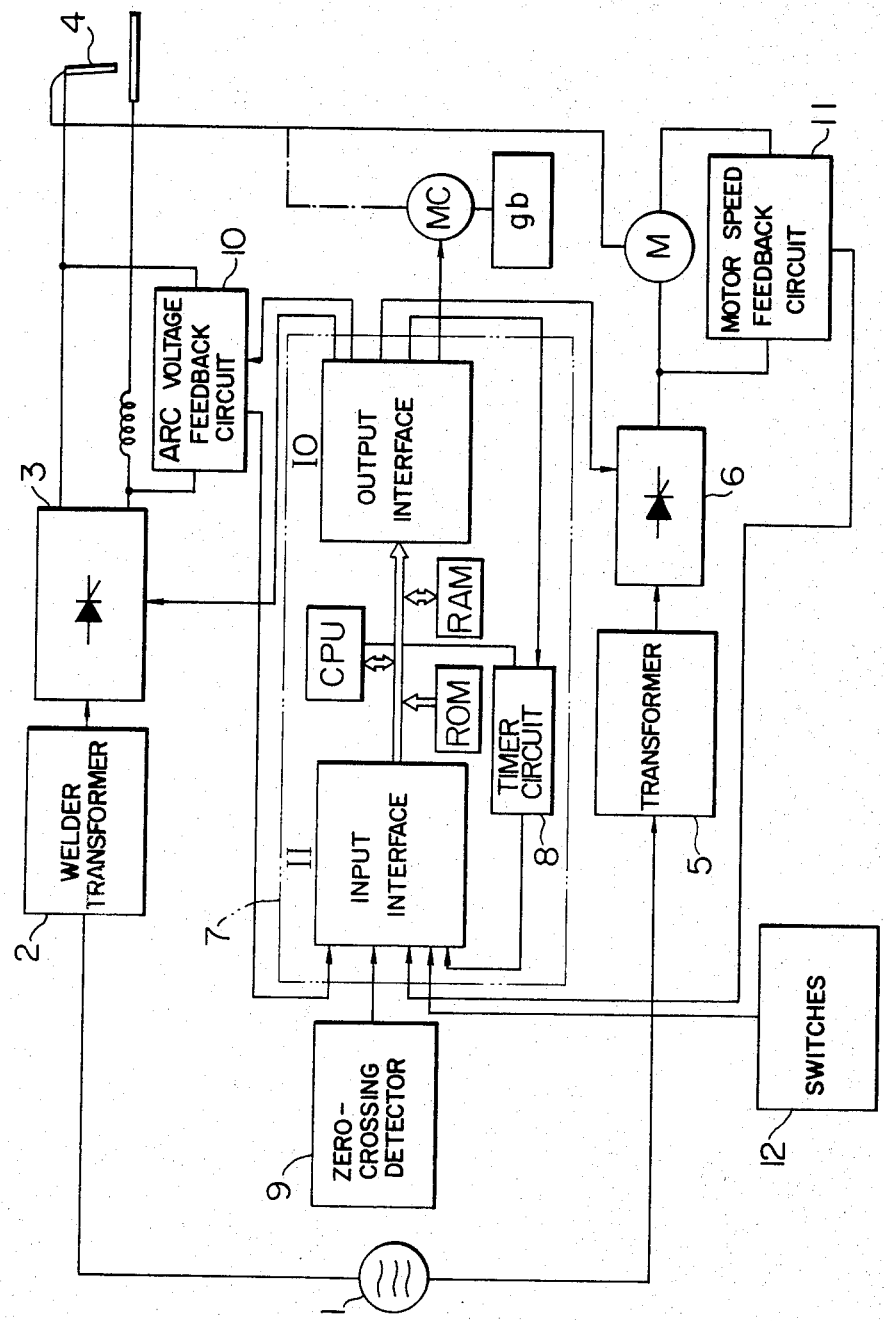
FIG. 1 shows an overall view of an embodiment of the present invention.

FIG. 1 shows, in a block diagram form, an overall configuration of one embodiment of the present invention which uses a microcomputer.

In FIG. 1, voltages from a three-phase A.C. power supply 1 are stepped down by a welder transformer 2 to voltages suitable for welding and also converted to six-phase A.C. voltages each having a phase difference of 60 degrees. They are applied to anodes of SCR's 3. Numeral 4 denotes a feeding wire type torch electrode to which a D.C. voltage is supplied from the SCR's 3.

On the other hand, the A.C. voltages from the three-phase A.C. power supply 1 are also applied to motor SCR's 6 through a transformer 5. A motor M functions to feed a wire to the welder torch electrode 4 and it is driven by a D.C. voltage from the SCR's 6. A welding current of the welding torch is proportional to the feeding speed of the wire or the rotation speed of the motor M. Numeral 7 denotes a main control circuit for effecting SCR firing phase control, wire feed control for the motor, and gas shield control for arc, and it comprises a central processing unit CPU, a memory ROM for storing a control program, a memory RAM for temporarily storing data during processing, an input interface II, an output interface IO and an SCR firing timing circuit (T) 8. Input signals to the main control circuit 7 include signals supplied from an A.C. voltage zero-crossing point detection circuit 9, an arc voltage feedback circuit 10, a motor speed feedback circuit 11 and various input setting switches 12, and output signals include those signals which are supplied to the arc voltage regulating SCR's 3, the motor speed controlling SCR's 6 and a gas solenoid value MV. The timer circuit 8 is connected to the input and output interfaces II and IO in the main control circuit 7 so that on and off conditions thereof are program controlled.

The operation of the circuit of FIG. 1 is now explained. Each time a zero crossing point of the A.C. voltage from the A.C. power supply 1 is detected by the zero-crossing point detection circuit 9, an interruption signal is supplied to the CPU through the input interface II. When the CPU receives the interruption signal, it fetches the signals from the arc voltage feedback circuit 10 and the motor speed feedback circuit 11 in accordance with a predetermined program stored in the ROM to calculate firing timings for the SCR's 3 and the SCR's 6 for controlling the voltage and the current of the welding torch electrode 4. The calculation results are temporarily stored in the RAM. Then, the timer circuit 8 is turned on to count the elapsed time from the zero-crossing point. They are compared with the calculation results, and when a predetermined firing time is reached the signals are sequentially produced to fire the respective SCR's 3 and 6. Then, the timer circuit 8 is turned off. The CPU repeats the above process each time the interruption signal is received in response to the A.C. voltage zero-crossing detection. The CPU also reads in the signals from the input setting switches 12 upon power-on or upon demand to calculate the welding voltage and the welding current in accordance with the welding conditions.

Figure 2:
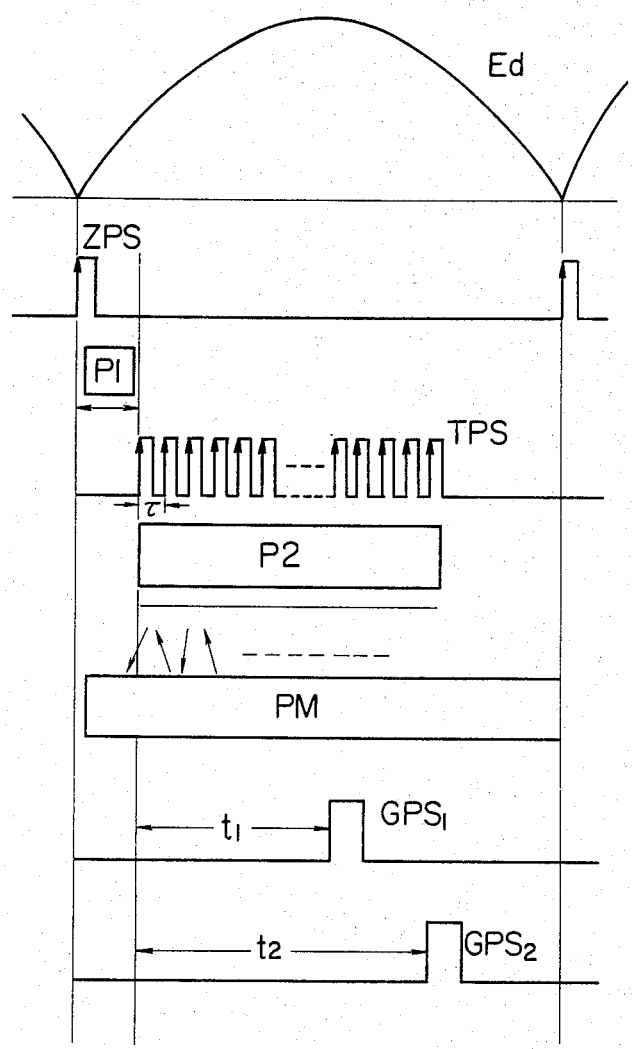
FIG. 2 illustrates a principle of control in the present invention.

Referring to FIG. 2, a principle of SCR firing phase control in the present invention is explained in detail. In FIG. 2, Ed represents a full-wave rectified voltage of one phase of the A.C. voltage, and ZPS represents a pulse signal which is applied to the CPU as the interruption signal through the input interface II in response to the zero-crossing detection by the zero-crossing detection circuit 9 shown in FIG. 1. When the pulse signal ZPS is applied, the CPU reads in the signals of the arc voltage feedback circuit 10 and the motor speed feedback circuit 11 in accordance with the procedures of an interruption analysis program P1 stored in the ROM and calculates firing timing $t_1$ for the welding voltage controlling SCR's and firing timing $t_2$ for the welding current controlling SCR's (i.e. motor speed controlling SCR's) to attain the desired welding voltage and welding current, and temporarily stores the calculation results in the RAM. After the completion of the above process, the timer circuit 8 shown in FIG. 1 is started to produce the timer pulse signals TPS of a predetermined frequency. When the timer pulse signals TPS are applied, as the interruption signal, to the CPU through the input interface II, the CPU follows another interruption analysis program P2 to count the number of times of the interruption by the tLmer pulses TPS, compares the count with the numbers of pulses corresponding to the firing times $t_1$ and $t_2$ calculated in accordance with the program P1, and when they are equal, the CPU provides gate signals GPS1 and GPS2 to the corresponding SCR's through the output interface IO. The gate signals may be either pulses or square waves. When the count of the timer pulses TPS has not reached the preset count, the CPU, after having counted the TPS, moves to the execution of a main program PM to carry out another job until next timer pulse interruption signal is received.

Figure 3:
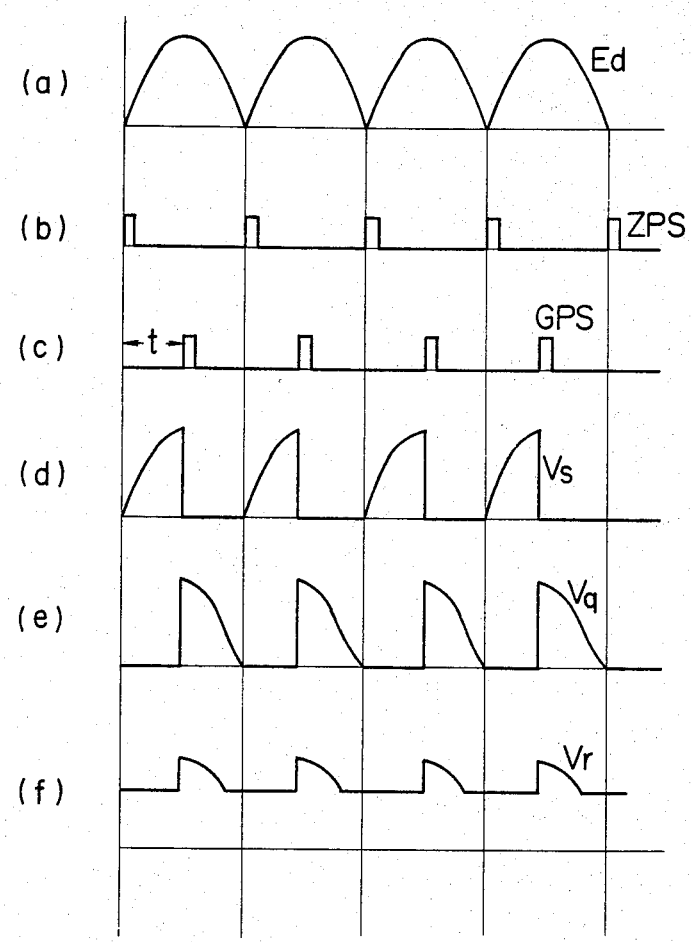
FIG. 3 shows voltage waveforms in accordance with the principle of control of the present invention.

FIG. 3 shows voltage waveforms for a pair of SCR's in accordance with the above principle. In FIG. 3, Ed represents the full-wave rectified voltage, ZPS represents the zero-crossing pulse signal, GPS represents a gate signal to the SCR's, $V_s$ represents an anode-cathode voltage of the SCR's, $V_q$ represents a load voltage when the SCR's are loaded, and $V_r$ represents a motor voltage when a motor is connected to the SCR's.

Figure 4:
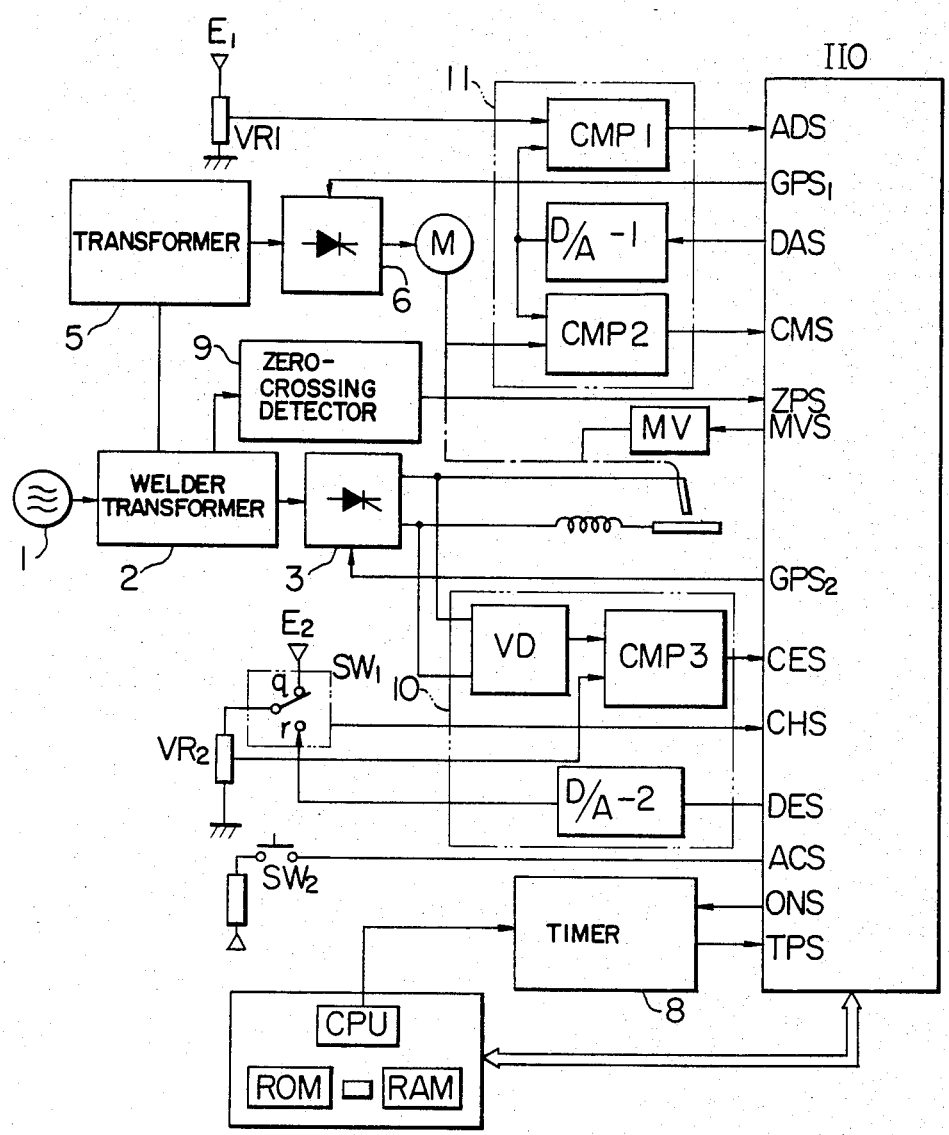
FIG. 4 shows detail of one embodiment of the present invention.

FIG. 4 shows embodiments of the arc voltage feedback circuit 10 and the motor speed feedback circuit 11 shown in FIG. 1 as well as signal lines between those circuits and an I/0 interface IIO (corresponding to the input interface II and the output interface IO shown in FIG. 1). In FIG. 4, the motor speed feedback circuit 11 comprises a comparator $CMP_1$, an D/A converter D/A-1 for producing a reference motor speed analog data, and a comparator $CMP_2$ which receives a motor counter-e.m.f. The reference motor speed data is produced by a sequential comparison method in the following manner. The CPU first sends out a minimum or maximum scale reference motor speed digital data DAS through the interface IIO. The digital data is converted to an analog data by D/A-1, which is then compared with a voltage across a current regulating potentiometer $VR_1$ by the $CMP_1$. A signal ADS representing the compared result is supplied to the CPU through the interface IIO. Depending on the compared result, the CPU increments or decrements the reference motor speed data DAS by one and presents the modified data to the D/A-1. The above process is repeated until the signal ADS reaches zero to finally produce the reference motor speed data DAS which corresponds to the voltage of $VR_1$. The voltage of $VR_1$, once it has been set, is usually not changed during the operation, and in a steady state operation the above comparison process is carried out once or twice. Each time the zero-crossing signal ZPS is supplied from the zero-crossing detection circuit 9, the analog signal corresponding to the reference motor speed data DAS is compared with the counter-e.m.f. which represents the actual speed of the motor M by CMP2 and the compared result is supplied to the CPU as a signal CMS through the interface IIO. Depending on the compared result, the CPU increments or decrements the previous motor SCR firing phase angle data by one and stores the modified data in the RAM. At the same time, the timer circuit 8 is started and when the count of the timer pulse signals TPS becomes equal to the data stored in the RAM, the gate signal GPS1 is applied to the SCR's 6. The above process is repeated for each zero-crossing detection so that the motor speed M corresponding to the voltage of $VR_1$ is finally attained.

Figure 5:
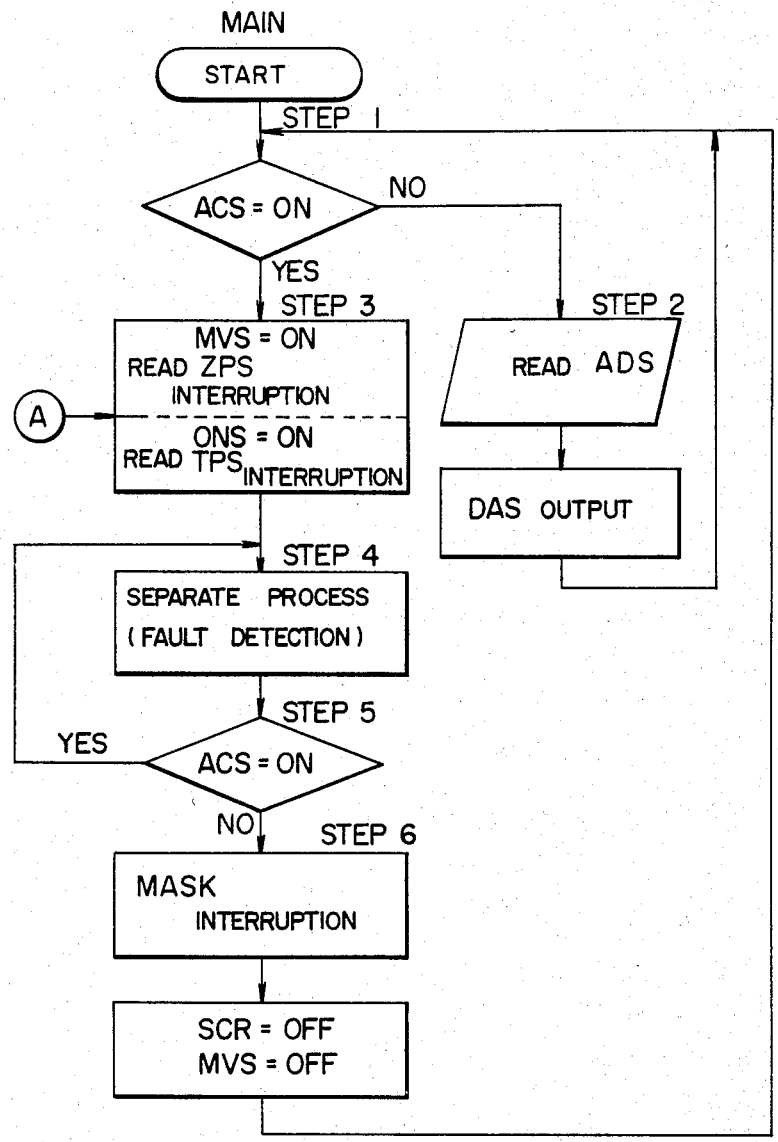
FIGS. 5 and 6 show flow charts of a control program.

On the other hand, the arc voltage feedback circuit 10 comprises an arc voltage detector VD, a comparator CMP 3 and a D-A converter D/A-2. A selection switch $SW_1$ selects an individual control mode and a union control mode (controlled by $VR_1$) for the arc current and the arc voltage. A contact q is for the individual mode while a contact r is for the union mode. The operation of the arc voltage feedback circuit 10 is basically identical to that of the motor speed feedback circuit 11. In the individual control mode, CMP 3 compares a voltage across a voltage regulating potentiometer $VR_2$ with an output of the arc voltage detector VD and supplies a compared result signal CES to the interface IIO. Depending on the signal CES, the CPU increments or decrements the previous arc voltage SCR firing phase data by one each time the zero-crossing is detected, and stores the modified data in the RAM. When the count of the timer pulse signals TPS reaches the data stored in the RAM, the gate signal GPS2 is supplied to the voltage SCR's. In the union control mode, a reference voltage data DES is calculated based on the reference motor speed data DAS instead of the voltage across VR2 and it is converted to an analog signal by D/A-2, the output of which is applied to one of the comparison input terminal of CMP 3. When the arc switch SW2 is turned on upon ACS=0, the gas solenoid value signal MVS shown in FIG. 4 is turned on at a step 3 and the process waits for the zero-crossing interruption signal ZPS. When the zero-crossing interruption signal ZPS is read, the process branches to an interruption analysis program of FIG. 6 to be described later, and upon completion of the program the process goes back to the program of FIG. 5 and turns on the timer start signal ONS shown in FIG. 4 and waits for the interruption by the timer pulse TPS. When the timer pulse TPS is read, the process again branches to the interruption analysis program of FIG. 6, and upon completion of the interruption process, the process moves to a step 4. In the step 4, failure of arc in the welding process or other faults are detected and countermeasures therefor are executed. In case of failure of arc, for example, a high non-load voltage is applied to the comparator CMP 3. In order to prevent a malfunction caused thereby, a firing data calculated immediately before the failure of arc is produced so that normal control is restored when the arcing is started again. In the next step 5, a decision for ACS=ON is made again and if it is ON the process goes back to the step 4, and if it is OFF the process moves to a step 6. In the step 6, the interruption to the CPU is masked and all the SCR's are turned off. Then the process goes back to the step 1 to make decision for ACS=ON.

Figure 6:
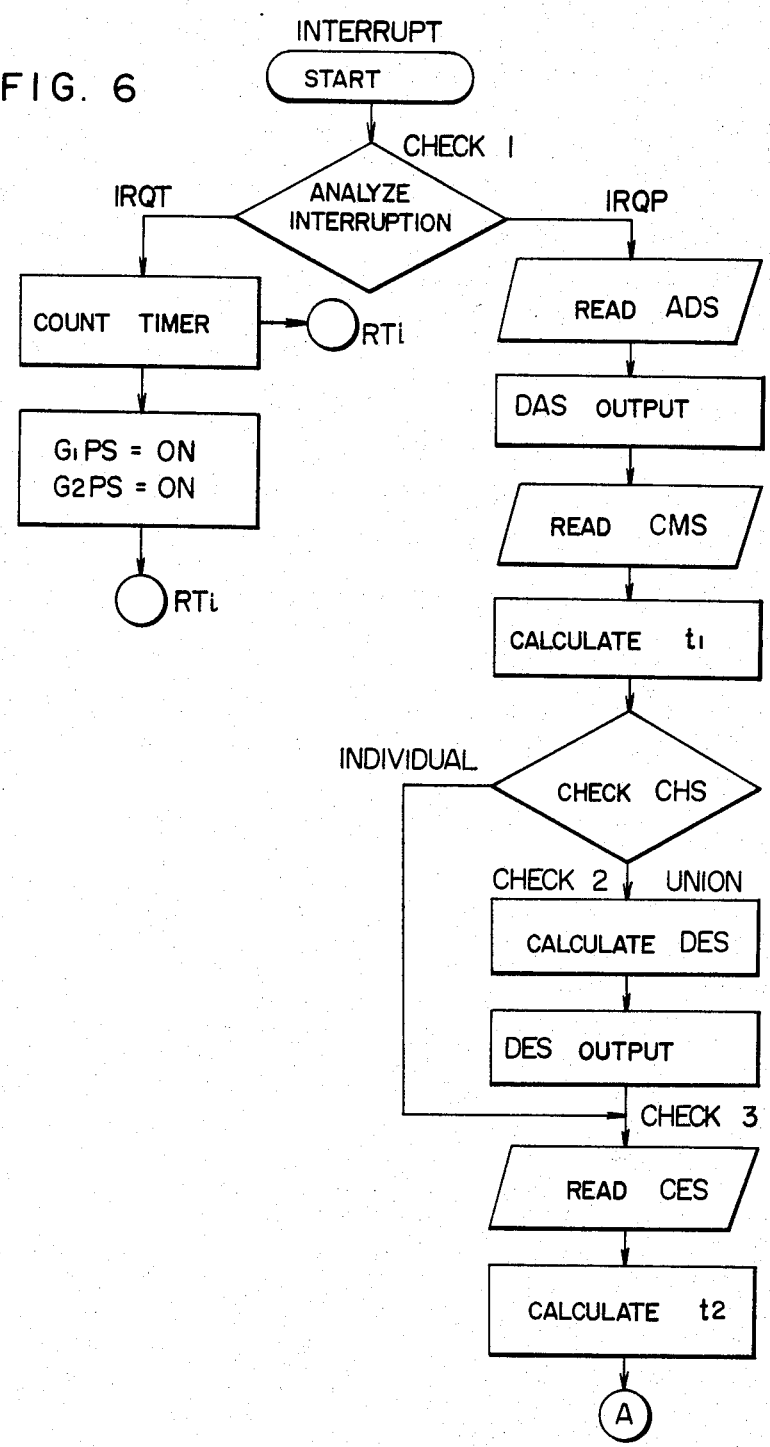

A flow shown in FIG. 6 is now explained. At a check point 1, the interruption is analyzed. If it is the interruption by the zero-crossing pulse ZPS, the process moves to IRQP, and if it is the interruption by the timer pulse TPS, the process moves to IRQT. In the IRQP, the ADS is first read and depending on the content thereof the DAS data calculated at the previous zero-crossing point is incremented or decremented and the modified DAS data is produced. This process is repeated until ADS reaches zero. Similarly, the firing angle calculated at the previous zero-crossing point, e.g. the data corresponding to $t_1$ in FIG. 2 is incremented or decremented and the modified data is stored in the RAM. Then, the status of the $SW_1$ is determined by CHS and if it is the individual control mode the process branches to a check point 3 where a similar process to that described above is executed. If it is the union control mode, the process moves to a check point 2 in which a reference voltage data is calculated based on the DAS data previously stored in the RAM and a table of relation between the DAS data and the DES data stored in the ROM, provides the calculated data to the DES and moves to the check point 3. Upon the completion of a series of IRQP program steps, the process goes back to the step of FIG. 5. The SCR firing angle calculation program includes a step to prevent overrun of the CPU to attain stable firing by providing limits (maximum and minimum) of the firing data to define a proper range for the firing angle. In the IRQT program, the number of the timer instruction pulses is counted and when the count reaches the firing time calculated in the IRQP program the arc voltage SCR's and the motor SCR's are fired. When the firing is completed or when the count has not reached the preset count, the process goes back to the main program or the step being executed at the time immediately after the timer interruption in FIG. 5.

Figure 7:
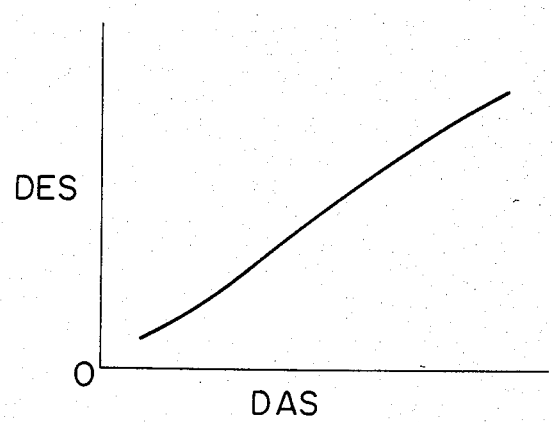
FIG. 7 illustrates a table used in the program.
Figure 8:
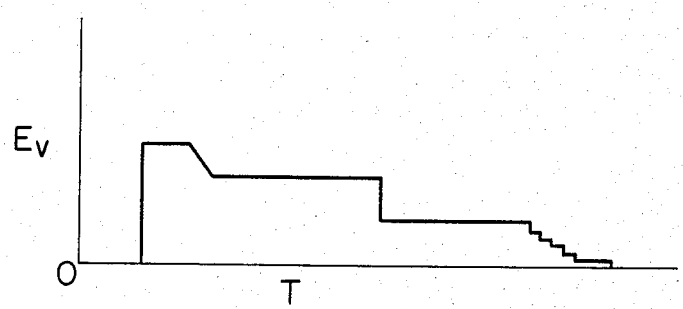
FIG. 8 illustrates an example of a welding sequence.

FIG. 7 shows a relation between the reference motor data signal DAS and the reference voltage data signal DES when the arc current and the arc voltage are individually controlled. This relation is stored in the table in the ROM. FIG. 8 shows an example of a welding sequence. Various welding sequences can be carried out by altering the program stored in the ROM.

Figure 9:
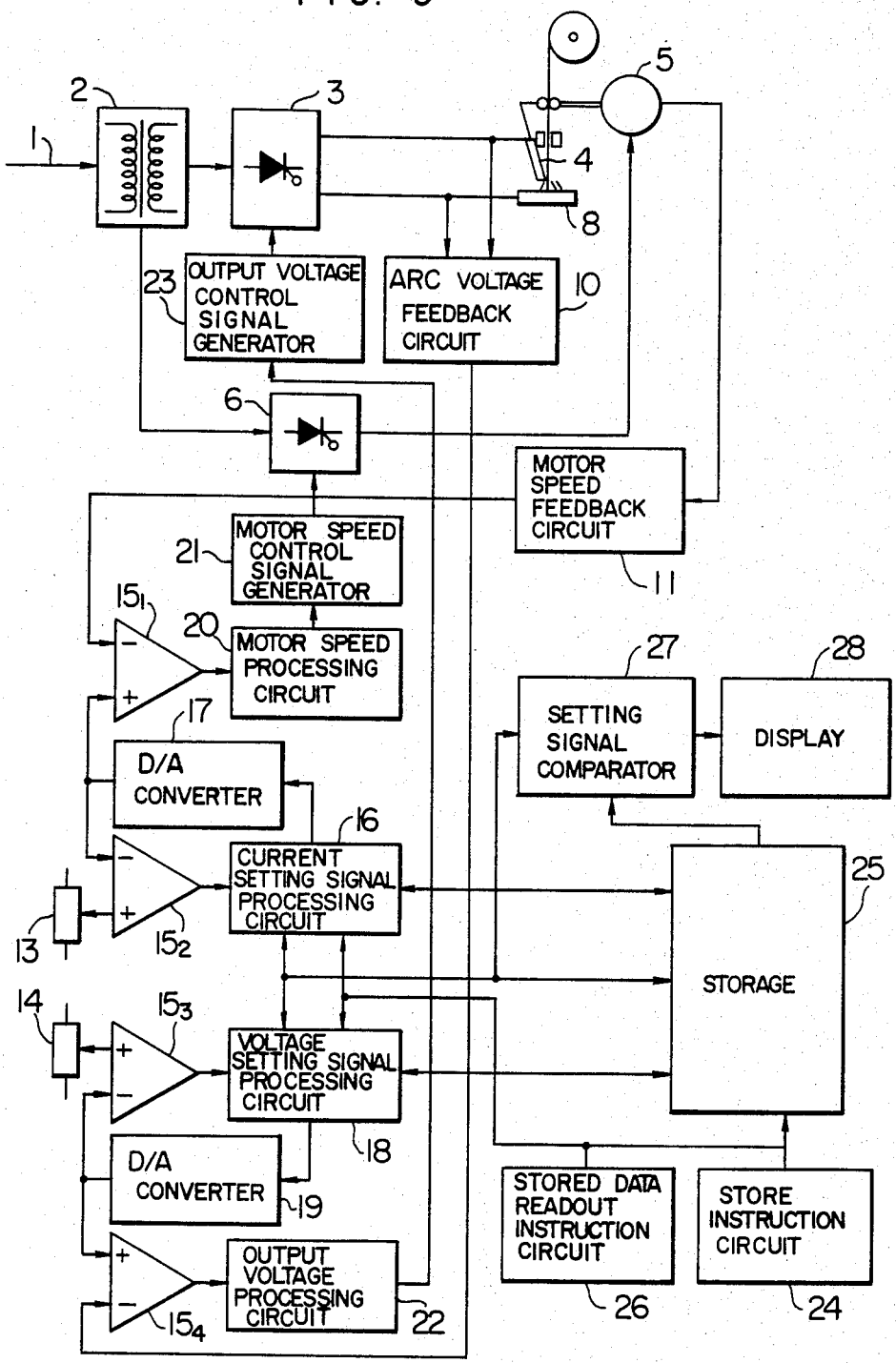
FIG. 9 shows an overall configuration of an embodiment of a condition storage circuit in accordance with the present invention.
Figure 10:
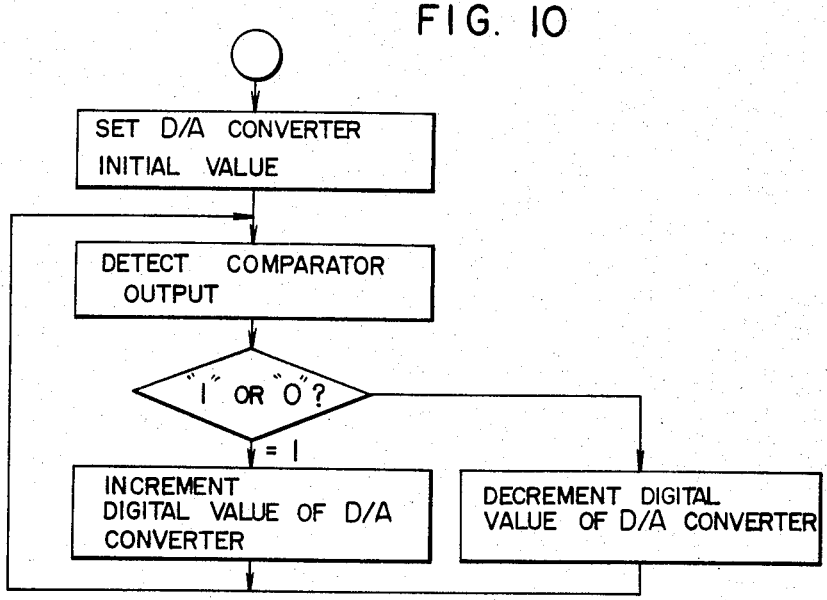
FIG. 10 illustrates a flow of position data formation of a setting element.

Referring now to FIG. 9, the condition storage circuit of the present invention is explained. FIG. 9 shows a block diagram of one embodiment in which an output voltage and a feed rate of a consumable electrode in a semi-automatic gas shield arc welder are simultaneously controlled. In FIG. 9, numeral 13 denotes a setting element for the welding current, and numeral 14 denotes a setting element for the welding voltage, both comprising potentiometers. When a target welding current is set by the setting element 13, a corresponding digital setting is produced by a closed circuit comprising a comparator $15_2$, a current setting signal processing circuit 16 and a D-A converter 17. When a target welding voltage is set by the setting element 14, a corresponding digital setting is produced by a closed circuit comprising a comparator $15_3$, a voltage setting signal processing circuit 18 and a D-A converter 19. For the target welding current setting provided by the setting element 13, the current setting signal processing circuit 16 first produces, in a digital form, an initial value of a comparison signal to be compared with the welding current setting. The digital value is then converted to an analog voltage by the D-A converter 17, which voltage is then compared with a voltage representing the welding current setting provided by the setting element 13, by the comparator $15_2$. Depending on the compared result, the current setting signal processing circuit 16 increments or decrements the previous initial value and retries the comparison. The above process is repeated until the outputs of the D-A converter 17 and the setting element 13 become equal to each other, when the current setting signal processing circuit 16 finally produces the digital value which corresponds to the welding current setting of the setting element 13. Similarly, the outputs of the setting element 14 and the D-A converter 19 are applied to the comparison circuit $15_3$ where the comparison is repeated until both outputs become equal, when the voltage setting signal processing circuit 18 finally produces a digital value which corresponds to the welding voltage setting of the setting element 14. FIG. 10 shows a flow of operation of those closed circuits. The amount of increment or decrement for the comparison signal and the numbers of bit positions of the D-A converters 17 and 19 are determined in accordance with a required accuracy for the setting signals.

When the digital setting signals corresponding to the setting elements 13 and 14 have been determined, the welding process is carried out by a feedback control described below. In FIG. 9, numeral 3 denotes the welding voltage SCR's which receive a power from the A.C. power supply 1 through the welding transformer 2 and control the welding voltage applied to the torch electrode 4 arranged to oppose to the article to be welded, and numeral 6 denotes the motor SCR's which receives the power from the A.C. power supply 1 through the transformer 2 and control the speed of the feed motor M for the torch electrode 4. The welding current of the electrode 4 is proportional to the feed rate of the torch electrode 4 or the rotation speed of the motor M.

In the welding process, the digital welding current setting produced by the current setting signal processing circuit 16 is converted to an analog welding current setting by the D-A converter 17 and the analog setting is applied to one input terminal of a comparator $15_1$. Applied to the other input terminal of the comparator $15_1$ is the output voltage of the motor speed feedback circuit 11 for detecting the speed of the electrode feed motor M. The analog welding current setting signal and the motor speed voltage are compared in the comparator $15_1$, and depending on the compared result a motor speed processing circuit 20 causes a motor speed control signal generating circuit 21 to generate a control signal to advance or retard the firing phase of the motor SCR's 6 by one step. As a result, the rotation speed of the motor M is controlled to follow the output of the D-A converter 17, that is, the welding current setting of the setting element 13. On the other hand, the digital welding voltage setting produced by the voltage setting signal processing circuit 18 is converted to an analog welding voltage setting signal by the D-A converter 19 and the analog signal is applied to a comparator $15_4$. Applied to the other input terminal of the comparator $15_4$ is the output voltage of the arc voltage feedback circuit 10. The welding voltage setting signal and the detected welding voltage are compared in the comparator $15_4$, and depending on the comparison result an output voltage processing circuit 22 causes an output voltage control signal generating circuit 23 to generate a control signal to advance or retard the firing phase of the welding voltage SCR's 3 by one step so that the welding voltage of the torch electrode 4 is controlled to follow the welding voltage setting of the setting element 14. If proper welding is not attained by the above welding process, the setting elements 13 and 14 are adjusted to modify the setting conditions of the welding current and the welding voltage. As a result, the digital welding current setting and the digital welding voltage setting are modified by the closed circuit comprising the comparator $15_2$, the current setting signal processing circuit 16 and the D-A converter 17, and the closed circuit comprising the comparator $15_3$, the voltage setting signal processing circuit 18 and the D-A converter 18, respectively, and the motor speed and the welding voltage follow those settings.

Numeral 24 denotes a store instruction circuit which, when proper welding is attained in the welding process, issues a write instruction signal so that the digital welding current setting and the digital welding voltage setting determined by the processing circuits 16 and 18, respectively, are stored in a storage circuit 25. When the welding process is subsequently carried out based on the stored data, a stored data readout instruction circuit 26 issues a readout instruction signal. As a result, specified data stored in the storage circuit 25 is read out to the current setting signal processing circuit 16 and the voltage setting signal processing signal 18 so that optimum welding current setting and welding voltage setting are determined. When the data stored in the storage circuit 25 is read, the processing circuits 16 and 18 do not read in the outputs of the comparison circuits $15_2$ and $15_3$.

Figure 11:
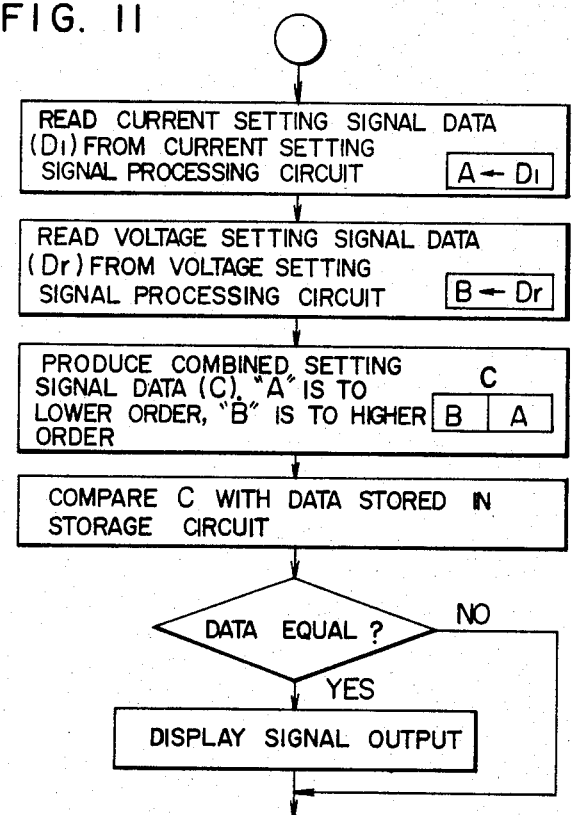
FIG. 11 illustrates a flow of determination of a proper setting signal.

A setting signal comparator 27 compare the digital data corresponding to the settings of the setting elements 13 and 14 determined by the processing circuits 16 and 18 with a data table of properly set data previously stored in the storage circuit 25. If both are equal in the comparison or not equal, signals are provided to a display 28 for identification. For example, when the welding current is set by the current setting element 13 and a proper welding voltage is to be determined by adjusting the voltage setting element 14, one may adjust the voltage setting element 14 while watching the display 28. In this manner, a proper setting position can be easily determined. FIG. 11 shows a flow of the operation of the display control. Alternatively, the output of the comparator 27 may be used to interlock the process so that the welding process is started only when the data corresponding to the settings of the setting elements 13 and 14 are equal to the proper data previously stored in the storage circuit 25. This reduces faults in the welding process such as failure of the arc.

Figure 12:
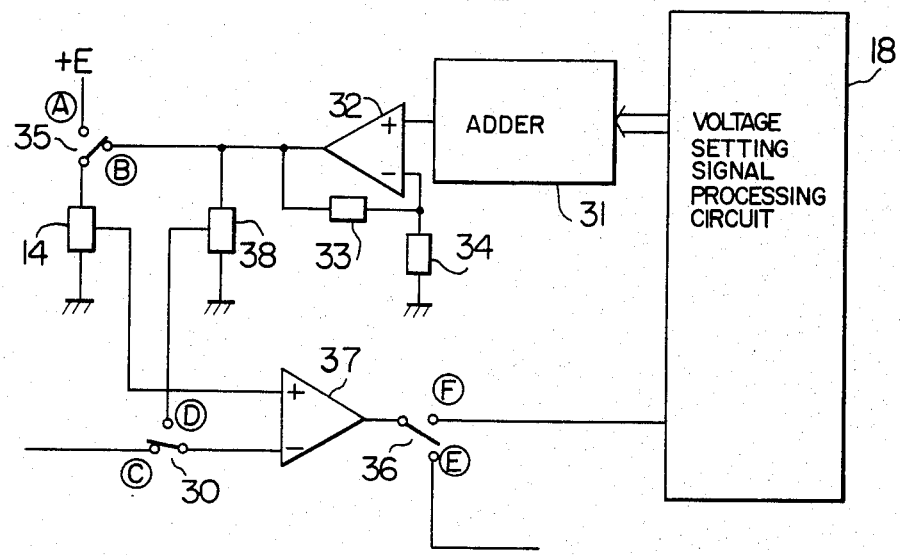
FIG. 12 shows an embodiment which enables fine adjustment.

In FIG. 9, when the data stored in the storage circuit 25 is read to use as the welding current and voltage settings, the welding conditions are fixed. Accordingly, it is inconvenient when the proper conditions shift by the variation of the size of article to be welded, change of environment and variation in individual operators. As a countermeasure therefor, an embodiment shown in FIG. 12 enables the fine adjustment in the reproduction operation. The embodiment of FIG. 12 shows an improvement in which the voltage comparator perform a dual function through switching of the circuit. When a switch 30 is thrown to a contact C, a comparator 37 corresponds to the comparator $15_4$ shown in FIG. 9, and when the switch 30 is thrown to a contact D, the comparator 37 corresponds to the comparator $15_3$ shown in FIG. 9. An adder 31, a linear amplifier 32 and resistors 33 and 34 correspond to the D-A converter 19 in FIG. 9. While only the portion pertinent to the welding voltage control is shown in FIG. 12, the portion pertinent to the welding current control may be similarly constructed.

In a standard welding process for checking the proper conditions, a switch 35 is thrown to a contact A to apply a power supply voltage +E to a potentiometer of the welding voltage setting element 14. The switch 30 is thrown to the contact C and a switch 36 is thrown to a contact E to establish an output feedback loop. Under this condition, the comparator 37 compares the feedback welding voltage with the reference welding voltage setting provided by the welding voltage setting element 14 to produce "1" or "0" output signal, in response to which the output voltage processing circuit 22 instructs the output voltage control signal generating circuit 23 to generate a control signal to increase or decrease the welding voltage to effect stabilization control of the welding voltage. When the setting position of the voltage setting element 14 is to be stored after the welding process, the switch 35 is kept at the contact A and the switch 30 is thrown to the contact D and the switch 36 is thrown to the contact F. As a result, a closed circuit is formed, which comprises the D-A converter including the adder 31 which receives the digital signal from the voltag setting signal processing circuit 18 and the linear amplifier for producing an analog-converted output, an auxiliary potentiometer 38, the comparator 37 and the voltage setting signal processing circuit 18, and the digital value corresponding to the potential of the welding voltage setting element 14 is established in the voltage setting signal processing circuit 18 by a similar operation to that of FIG. 9. The auxiliary potentiometer 38 is preadjusted to appropriately divide the output of the linear amplifier 32 with the divided output being supplied to the comparator 37. The digital value established in the voltage setting signal processing circuit 18 is stored in the storage circuit 25.

When the welding process is to be carried out based on the digital data read from the storage circuit 25, the switch 35 is thrown to the contact B, the switch 30 to the contact C and the switch 36 to the contact E. The welding voltage setting element 14 is set to a dividing point which corresponds to the dividing ratio of the auxiliary potentiometer 38. The dividing position can be readily set by displaying it on a control panel as the standard setting position in the stored data readout mode. By producing the stored data from the voltage setting signal processing circuit 18, the welding voltage setting corresponding to the stored data is applied to the comparator 37 through the adder 31, the linear amplifier 32 and the voltage setting element 14, and the stored data is compared with the feedback voltage so that stabilized feedback control of the welding voltage is attained. By appropriately adjusting the setting element 14, the voltage setting corresponding to the stored data applied to the comparator 37 changes so that the fine adjustment is attained.

Figure 13:
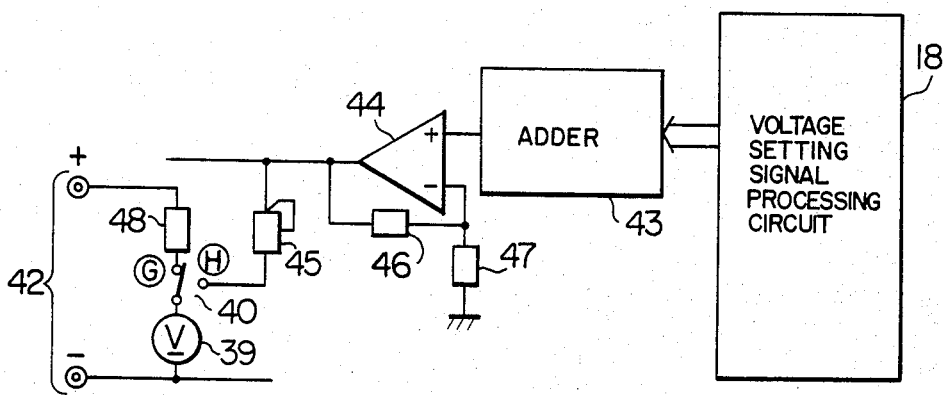
FIG. 13 illustrates an example of monitoring of stored data by a meter.

FIG. 13 shows a circuit for monitoring the stored data in an inexpensive and simple way by an ammeter or voltmeter for indicating the welding phenomena such as welding voltage. The illustrated embodiment monitors the stored data of the welding voltage setting by a voltmeter 39 for indicating the welding voltage. Normally, a switch 40 is thrown to a contact G. Under this condition, the voltmeter 39 indicates the welding voltage across an output terminal 42 through a current limiting resistor 41. When the stored data is to be monitored, the switch 40 is thrown to a contact H to connect the output of the D-A converter comprising an adder 43 and a linear amplifier 44 to the voltmeter 39 through a potentiometer 45. As a result, the stored data corresponding to the welding voltage setting, applied to the voltage setting signal processing circuit 18 is converted to an analog voltage by the adder 43 and the linear amplifier 44 and the analog voltage is indicated by the voltmeter 39. By adjusting the potentiometer 42 or converting the stored data to give the same indication as that given by the actual welding voltage corresponding to the stored data, the check operation is further facilitated. Numerals 46, 47 and 48 denote resistors.

The D-A converter comprising the adder 43 and the linear amplifier 44 may be an exclusive circuit or it may be the circuit shown in FIG. 12. While FIG. 13 shows the circuit for indicating the analog signal converted from the stored data, the digital value provided by the voltage setting signal processing circuit 18 may be directly indicated by providing a digital display circuit.

Figure 14:
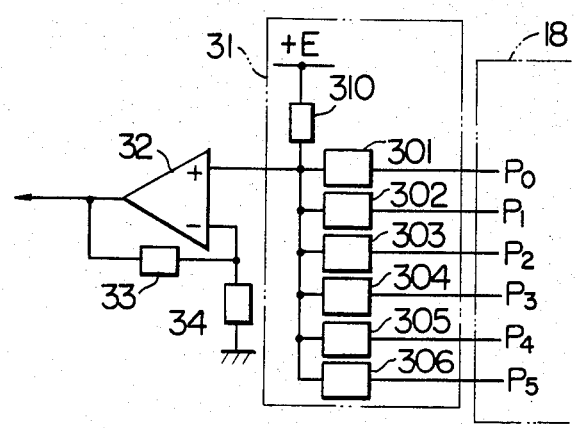
FIG. 14 shows an example of an adder circuit used in a D-A converter.
Figure 15:
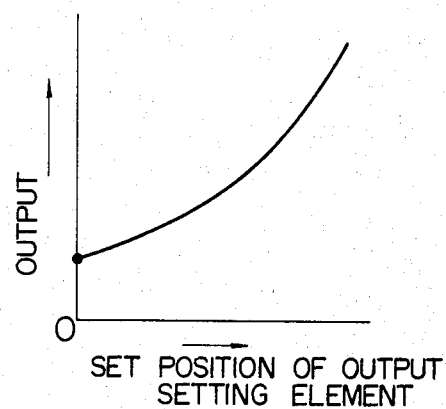
FIG. 15 a relation between an adjusted position of a setting element and an output level.

An example of the adder circuit 31 shown in FIG. 12 is shown in FIG. 14. The adder circuit 43 shown in FIG. 13 is also basically similar. In the illustrated embodiment, a six-bit digital output is produced and the processing circuit 18 produces a binary coded digital output with bits $P_0$–$P_5$ being either high level ($+E$) or low level (GND). Numerals 301–306 denote function resistors with a resistance ratio of adjacent two resistors being 2 with higher bit resistors being smaller. Accordingly, depending on the digital output $P_0$–$P_5$, the linear amplifier 32 produces an analog signal which changes stepwise. Because of six-bit configuration in FIG. 14, the analog signal is equidivided into 64 ($=2^6$) segments. In the welder, it is usually required to produce a certain level of output even at the lowest position of the function resistors of the setting element as shown in FIG. 15. Accordingly, a resistor 310 is connected to the power supply ($+E$) so that all of the bits of the digital output can be effectively used.

While the preferred embodiments of the present invention has been explained, the configuration of FIG. 9 as well as FIG. 12 may be constructed by a microcomputer. In such a case, the functions of the motor speed processing circuit 20, the current setting signal processing circuit 16, the voltage setting signal processing circuit 18 and the output voltage processing circuit 22 are consolidated by a central processor so that a desired process is carried out under a programmed control. The storage circuit 25 may be taken place by a RAM.

In FIG. 9, the closed circuit of 16, 17 and $15_2$ or the closed circuit of 18, $15_3$ and 19 is used to produce the digital signal corresponding to the setting signal of the setting elements 13 and 14, by sequential comparison. By inserting A-D converters between the setting elements 13 and 14, and the processing circuits 16 and 18, the digital signals corresponding to the setting signals can be directly produced.

Figure 16:
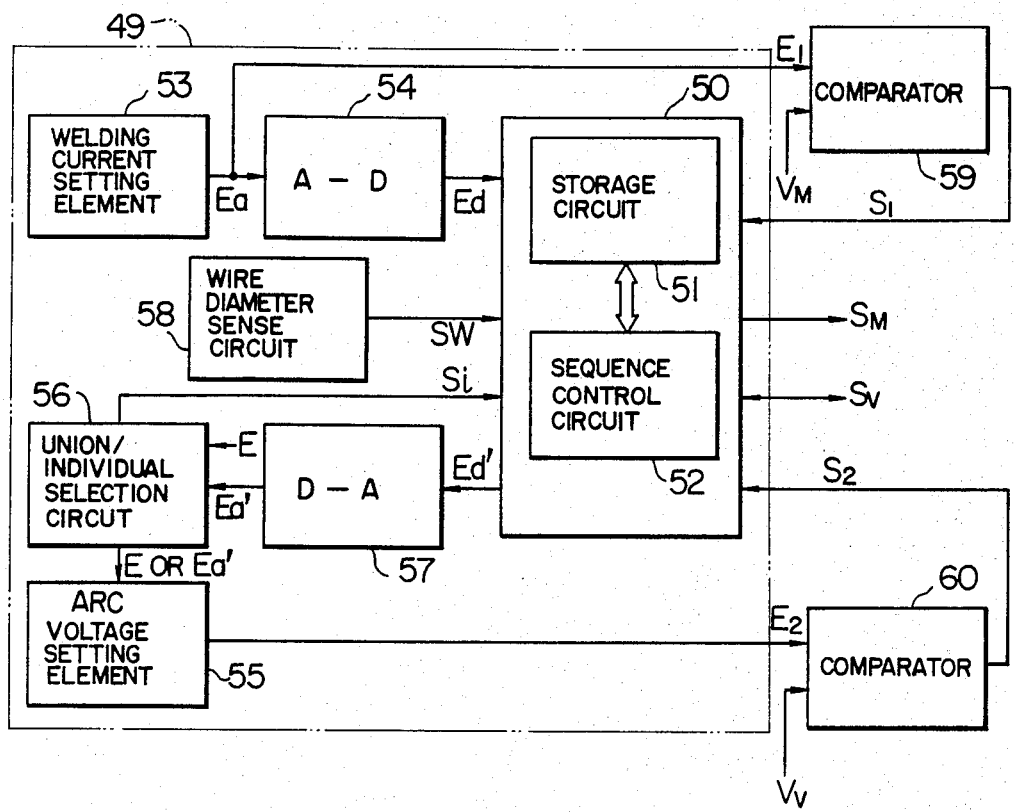
FIG. 16 shows a block diagram of one embodiment of a union/individual control circuit of the present invention.
Figure 17:
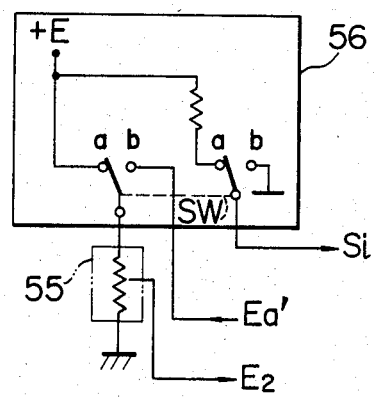
FIG. 17 shows detail of a union/individual selection circuit in FIG. 16.

Referring to FIG. 16, a union/individual control circuit of the present invention is explained. FIG. 16 shows a block diagram of one embodiment in which numeral 49 denotes the union/individual control circuit and a block 50 is a main control unit thereof. The control unit 50 comprises a storage circuit 51 which stores one or more optimum relations of the arc voltage and the welding current and a sequence control circuit 52 for reading out an optimum reference arc voltage for a welding current setting reference voltage from the storage circuit 51 in response to the setting signals to carry out the union control. Numeral 53 denotes a welding current setting element such as a potentiometer. A voltage $E_a$ thereacross is converted to a digital value $E_d$ by an A-D converter 54 and the digital signal is applied to the control unit 50. Numeral 55 denotes an arc voltage setting element such as a potentiometer which, in the union control mode, functions as a fine adjusting element for the arc voltage. Applied to the arc voltage setting element 55 in the individual control mode is a reference voltage E like in the prior art through a union/individual selection circuit 56, and in the union control mode an analog voltage $E'_a$ derived from a D-A converter 57 by converting a digital optimum arc voltage for the digital welding current setting provided by the control unit 50. FIG. 17 shows detail of the union/individual selection circuit 56. When a switch SW is thrown to a contact a, the individual control is carried out, and when the switch SW is thrown to a contact b, the union control is effected. The switch SW is actuated manually. Si represents a union/individual identification signal which supplies a high level signal to the control unit 50 in the individual control mode, and a low level in the union control mode.

In FIG. 16, $E_1$ represents the welding current setting reference voltage and $E_2$ represents the arc voltage setting reference voltage. SW represents a wire diameter signal which is produced by a wire diameter sense circuit 58 which senses the wire diameter by a contact voltage between a wire diameter selection roller of the motor and the wire. The wire diameter sense circuit 58 includes an A-D converter. The wire diameter may be set directly by a switch signal. Numeral 50 denotes a comparator for comparing a motor terminal voltage $V_M$ representing the actual speed of the motor with the reference voltage $E_1$, and numeral 60 denotes a comparator for comparing the arc voltage $V_V$ with the reference voltage $E_2$. $S_1$ and $S_2$ represent output signals of the comparators 59 and 60, respectively. Those signals are examined by the sequence control circuit 52 which produces a motor SCR control signal $S_M$ and an arc voltage SCR control signal $S_V$.

The control unit 50 of FIG. 16 is preferably implemented by a microcomputer. In this case, the storage circuit 51 for storing the relations of the welding current and the arc voltage can be realized by a RAM. The sequence control circuit may comprises a ROM for storing a series of procedure programs and a CPU for executing the access to the RAM and other operations in accordance with the programs.

Figure 18:
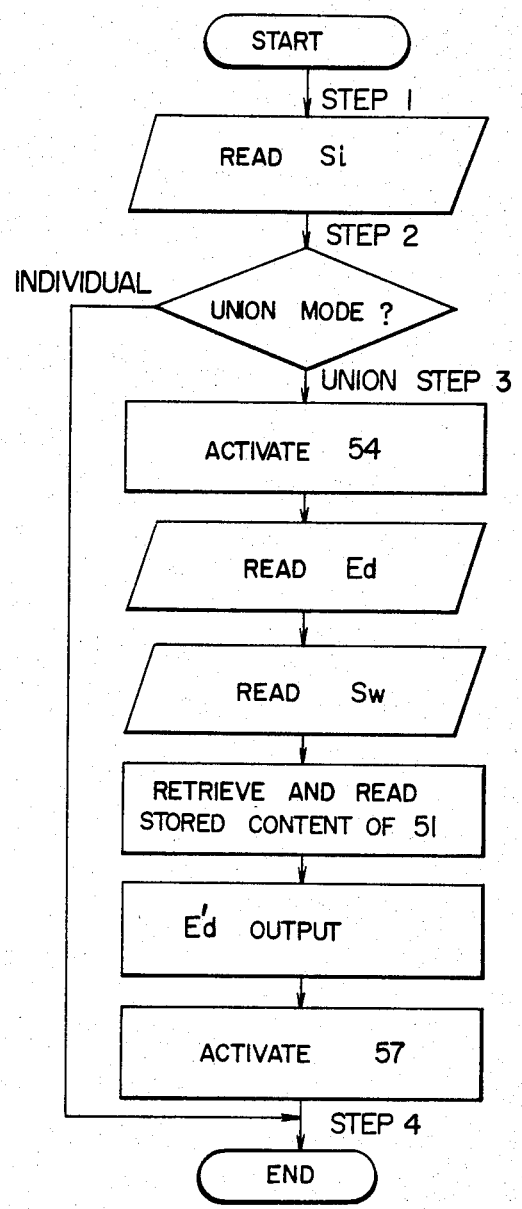
FIG. 18 illustrates a flow of union/individual control operation in FIG. 17.

FIG. 18 shows a flow chart of a program previously stored in the ROM for the union/individual control when the control unit 50 is implemented by the microcomputer. Referring to FIG. 18, the operation of FIG. 16 is explained. In a step 1, the union/individual detection signal $S_i$ of the union/individual selection circuit 56 is read. In a step 2, the union or individual mode is determined based on the union/individual detection signal $S_i$. If it is the union control mode, the process proceeds to a step 3 where the A-D converter 54 is activated to read the digital value $E_d$ of the welding current setting reference voltage $E_a$ and then the wire diameter signal $S_W$ (in digital form) is read. Based on the information $E_d$ and $S_W$, the storage circuit 51 is accessed to determine the digital value $E'_d$ of the arc voltage setting reference voltage $E'_a$ from one or more stored relations of the welding current and the arc voltage. The D-A converter 57 is then activated to supply the arc voltage setting reference voltage $E'_a$ to the arc voltage setting element 55 through the union/individual selection circuit 56. On the other hand, if the individual control mode is determined in the step 2, the process moves to a step 4 to terminate the process without executing the above step. In the individual control mode, the voltage E is directly applied to the arc voltage setting element 55 by the union/individual selection circuit 56.

During the welding process, the output voltage $E_a$ from the welding current setting element 53 is applied to the comparator 59 as the welding current setting reference voltage $E_1$, and the output voltage of the arc voltage setting element 55 is applied to the comparator 60 as the arc voltage setting reference voltage $E_2$. The other inputs to the comparators 59 and 60 are the motor terminal voltage $V_M$ and the arc voltage $V_V$, respectively. The sequence control circuit 52 reads in the output signals $S_1$ and $S_2$ of the comparators 59 and 60 at each zero-crossing point of the A.C. power supply and determines their polarities. Based on whether they are positive or negative, it produces the control signals $S_M$ and $S_V$ for advancing or retarding the firing phase angles of the motor SCR's and the arc voltage SCR's. A program for executing the above step may be stored in the ROM and is executed after the process of FIG. 18. In the above explanation, the polarities of the outputs of the comparators 59 and 60 are examined and based on the results the control signals $S_M$ and $S_V$ are produced to advance or retard the firing phase angles of the SCR's. Alternatively, the comparators 59 and 60 may detect a difference between $E_1$ and $V_M$ and a difference between $E_2$ and $V_V$, those differences are converted to digital values by A-D converters, and the digital values are applied to the sequence control circuit 52 which produces the signals $S_M$ and $S_V$ indicating the firing timing of the SCR's.

Figure 19:
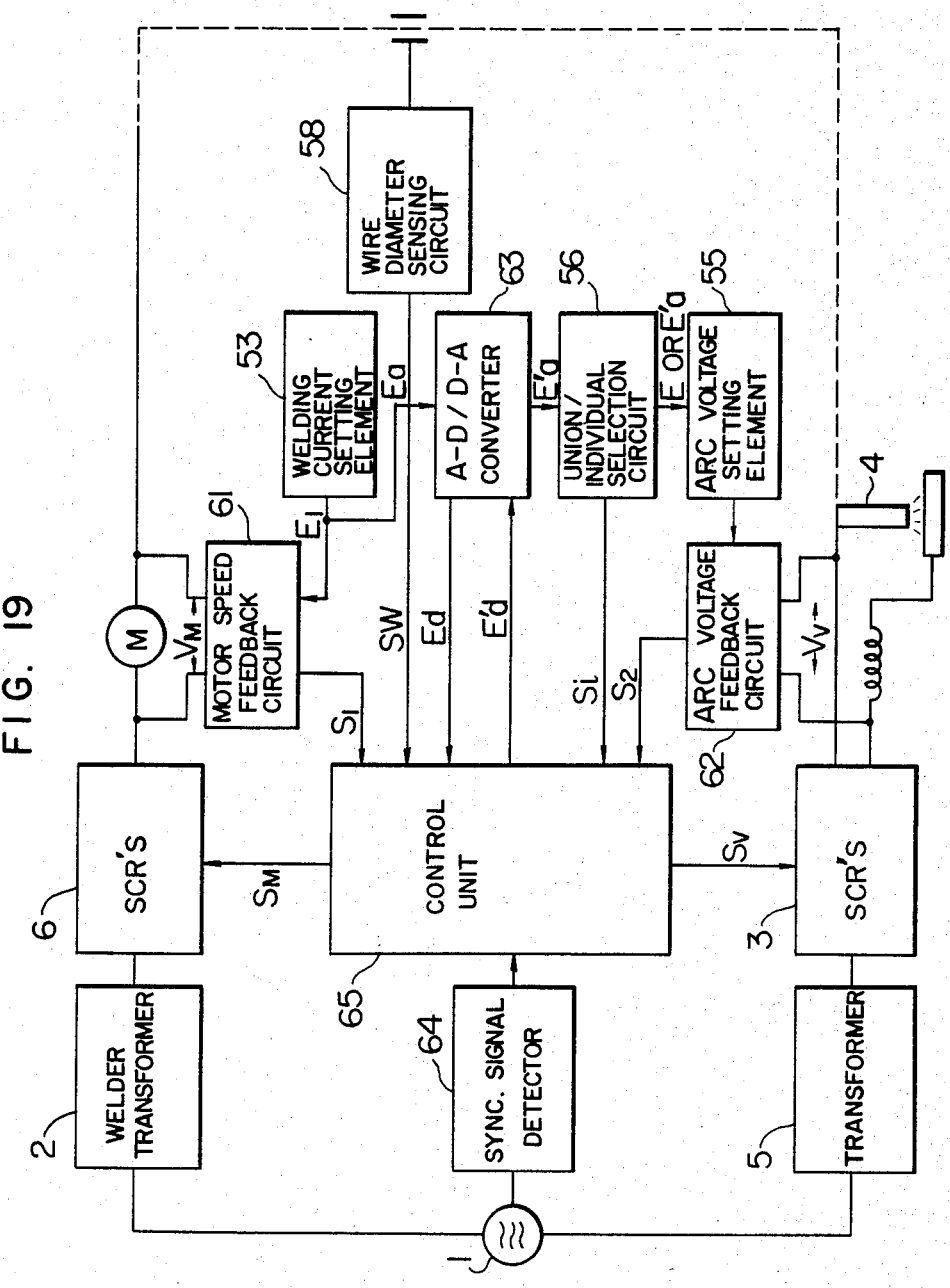
FIG. 19 shows an overall configuration of one embodiment of an arc welder having the union/individual control circuit.

FIG. 19 shows an overall configuration of an embodiment of an arc welder having a union/individual control circuit. In FIG. 19, numeral 61 denotes a motor speed feedback circuit which compares the terminal voltage $V_M$ of the wire feeding motor M with the reference voltage $E_1$ from the welding current setting element 53 to produce the motor terminal voltage feedback signal $S_1$. It corresponds to the block 59 of FIG. 16. Similarly, numeral 62 denotes an arc voltage feedback circuit which compares the voltage $V_V$ of the welder torch electrode 4 with the reference voltage $E_2$ from the arc voltage setting element 55. It correspond to the block 60 of FIG. 16. Numeral 63 denotes an A-D/D-A converter which has a function of converting the welding current setting reference voltage $E_a$ of the welding current setting element 53 to the digital value $E_d$ and a function of converting the digital value $E'_d$ to the arc voltage setting reference voltage $E'_a$. The A-D/D-A converter is thus a combination of the converters 54 and 57 of FIG. 16. Numeral 64 denotes a synchronizing signal detector which detects the zero-crossing points of the voltage waveform of the A.C. power supply 1. Numeral 65 denotes a block which corresponds to the control unit 50 of FIG. 16 and which may be implemented by a microcomputer. Numerals 2 and 5 denote the transformers, numeral 6 denotes the motor speed (or welding current) controlling SCR's, numeral 3 denotes the arc voltage controlling SCR's and numeral 58 denotes the wire diameter sense circuit.

As explained above in connection with FIG. 16, when the union control mode is selected by the output sign $S_i$ of the union/individual selection circuit 56, the control unit 65 of FIG. 19 reads in the wire diameter signal $S_W$ and the digital welding current setting $E_d$ prior to the welding process and produces the optimum digital arc voltage setting $E'_d$ based on the prestored relation of the welding current and the arc voltage. The corresponding analog voltage $E'_a$ is produced by the A-D/D-A converter 63 and applied to the arc voltage setting element 55 through the union/individual selection circuit 56. During the welding process, each time the synchronizing signal detection circuit 64 detects the zero-crossing point of the A.C. voltage waveform, the control unit 65 reads in the motor terminal voltage feedback signal $S_1$ and the arc voltage feedback signal $S_2$ to calculate the firing timings of the SCR's 3 and 6 for controlling the voltage and the current of the welder torch electrode 4 in order to produce the SCR firing control signals $S_M$ and $S_V$. The operation of the control unit 65 in the welding process is not the subject of the present invention and hence it is not described in detail here.

In the embodiment shown in FIG. 16, two display means may be provided with one display means displaying the welding current setting voltage $E_a$ or its digital value $E_d$ while the other display means displaying the arc voltage setting digital value $E'_d$ or its analog value $E'_a$ for the welding current setting reference voltage $E_a$ read from the storage circuit 51 in order to display the optimum arc voltage for the welding current setting in the union control mode to an operator. Interlock means may be provided in the welding start operation so that the welding operation may be started only when the arc voltage setting corresponding to the welding current setting is read from the storage circuit 51 and the start of the welding operation is inhibited when the predetermined arc voltage setting is not obtained. This may be easily attained in the flow chart of FIG. 18 by adding a step "Retrieval Successed?" after the step "Retrieve and Read Stored Content". While the illustrated embodiment explains the case where the union control mode is performed by reading the optimum arc voltage for the welding current setting from the storage circuit 51, it should be understood that the present invention is equally applicable to the opposite case.

As is apparent from the foregoing description, the present invention provides the following advantages:

(1) The control circuit of the arc welder may be implemented by a microcomputer which can consolidate the complex circuits of the prior art. Accordingly, the number of components and parts can be reduced and the connecting wires can be shortened. Consequently, a highly reliable arc welder which is not influenced by external noise is attained. The change of the welding sequence or the addition of functions can be readily attained by modifying the program stored in the ROM. Thus, the problems encountered in the prior art are resolved.

(2) Since the setting position signals of the setting elements corresponding to the proper welding conditions are stored and they are used with the feedback stabilization control, the stored data are retrieved at the same conditions irrespective of the external disturbance such as fluctuation of the power supply voltage.

(3) The number of parts and components such as resistors in the union/individual control circuit can be substantially reduced. The troublesome adjustment of the potentiometers is not necessary. By using the optimum relations of the welding current and the arc voltage which are previously stored, the arc welder having the union control function which is more accurate than the prior art system using approximation control and less affected by the fluctuation of the power supply voltage is provided.

What is claimed is:

1. An arc welder comprising welding condition setting means, control circuit means for detecting and feeding back a welder output to control said welder output to a target value of a condition setting signal determined by said welding condition setting means, storage means for storing at least one proper condition setting signal determined by said welding condition setting means, and stored signal retrieving means for reading out the stored signal in said storage means to set the read-out stored signal as the target value in place of the condition setting signal determined by said welding condition setting means, wherein said arc welder is an automatic arc welder having a function of automatically feeding a condumable wire electrode, and said welding condition setting means produces a wire feed rate signal and a welding voltage signal as said conditon setting signal, and said storage means prestores data of allowable combinations of wire feed rate setting signals and output voltage setting signals which meet proper welding conditions, and further comprising means for comparing and checking if the wire feed rate setting signal and the welding voltage setting signal determined by said welding condition setting means meet a data condition of said proper welding condition setting signals stored in said storage means and for producing an output signal when said data condition is met, and display means being controlled by said output signal to display that the proper conditions are being set.

2. An arc welder according to claim 1 further comprising means for interlocking a welding process start signal in response to said output signal produced only when the setting signals determined by said welding condition setting means meet said data condition so that the welding process is started only when the setting signals are proper.

3. An arc welder in which a welding arc is established between a welding electrodes and a workpiece for effecting welding comprising:

SCR circuit means for receiving an A.C. Voltage input and for at least regulating an output of an arc welding power supply for the welding;

first detection circuit means for detecting the arc condition including the output of said arc welding power supply and providing an output indicative thereof;

second detection circuit means for detecting a predetermined point on a waveform of said A.C. voltage and providing an output indicative thereof;

setting circuit means for setting the arc condition including the output of said arc welding power supply and providing an output indicative thereof;

control circuit means for reading in the output of said first detection circuit means and the output of said setting circuit means each time when said second detection circuit means detects the predetermined point on the waveform of said A.C. voltage for calculating a firing time for said SCR circuit means, said control circuit means counting timing pulses and producing a SCR control signal when the count reaches the calculated firing time so as to automatically control the firing angle of said Scr circuit means, and wherein said electrode is a consumable wire electrode and motor means are provided for feeding said wire electrode, said SCR circuit means further regulating the speed of said motor means, said SCR circuit means including a first SCR circuit for regulating the output of the arc welder power supply and a second SCR circuit for regulating the speed of said motor means, said first and second SCR circuit being responsive to said second detection means, and said first detection circuit means further detecting the speed of said motor means and providing an output indicative thereof.

4. An arc welder according to claim 3, wherein said control circuit means includes a computer having a storage means and processing means for executing a process under program control.

5. An arc welder according to claim 4, wherein said first detection circuit means comprises one detection circuit provided at the input to said computer, said one detection circuit including an arc voltage detector for detecting the arc voltage and supplving an output to a comparator receiving an output from said setting circuit means, and a digital-to-analog converter coupled to said computer, and another detection circuit provided at the input of said computer including a digital-to-analog converter, a first comparator for comparing an output of said digital-to-analog converter with an output of said setting circuit means, and a second comparator for comparing an output of said digital-to-analog converter with an output indicative of motor speed.

6. An arc welder according toclaim 5, wherein said setting circuit means includes a first potentiometer connected at the input thereof to a first voltage source and at the output thereof to said first comparator of said another detection circuit, a second potentiometer selectively connected by a switch means at the input thereof to a second voltage source or to the output of said digital-to-analog converter of said one detection circuit and at the output thereof to said comparator of said one detection circuit.

7. An arc welder according to claim 6, wherein said switch means enables the selection of a union control mode or an individual control mode for at least the arc voltage.

8. An arc welder according to claim 4, wherein said processing means and said storage means are responsive to the interruption of an arc for holding information of the SCR firing angles at the time immediately before the interruption of the arc for a predetermined time period and, in response to the reestablishment of an arc, utilizing the information of the SCR firing angles for continuing the welding.

9. An arc welder according to claim 8, wherein said processing means includes means for limiting the SCR firing angles and for maintaining the firing angles within the limits so that stable arc voltage and welding current are produced.

10. An arc welder according to claim 4, wherein said second detection circuit means detects the zero-crossing of the waveform of said A.C. voltage input as the predetermined point on the waveform of said A.C. voltage input to said first and second SCR circuits.

11. An arc welder according to claim 4, wherein said setting circuit means includes first and second potentiometer means for providing outputs in accordance with set values thereof, said computer including first and second comparators receiving respective outputs from the first and second potentiometers, said first and second comparators also receiving respective inputs from first and second digital-to-analog converters, said Processing means including first and second setting signal processing circuits connected respectively to the outputs of said first and second comparators, third and fourth comparators for receiving outputs of said first detection circuit means of respectively the speed of said motor means and the output of said welding power supply, said third and fourth comparators also receiving respective outputs from said first and second digital-to-analog converters, the third and fourth comparators providing outputs for controlling the SCR firing angles of said SCR circuit means for motor speed control and welding power supply output, respectively.

12. An arc welder according to claim 11, further comprising switching means for selectively enabling two input signals to be supplied to a single comparator.

13. An arc welder according to claim 11, wherein said second digital-to-analog converter includes an adder supplying an output to a linear amplifier, said linear amplifier having first and second resistors connected to another input of said linear amplifier, said first resistor being connected for receiving an output of said linear amplifier.

14. An arc welder according to claim 13, further comprising a switch for selective connection with a current limiting resistor and a volt meter for enabling a display of the welding voltage across a pair of terminals and for connection of said volt meter to a potentiometer connected to the output of said linear amplifier for enabling a display of the output signal of said second digital-to-analog converter.

15. An arc welder according to claim 13, wherein said adder comprises a plurality of parallel-connected function resistors, said function resistors each being connected to a respective bit terminal of said processing means and connected in common to a common connection point, said common connection point being connected to an input of said linear amplifier and to a power supply through a resistor.

16. An arc welder according to claim 4, wherein said computer further comprises an analog-to-digital converter and a digital-to-analog converter connected to said setting circuit means, first and second comparators, for receiving inputs from said setting circuit means and for supplying outputs to said computer.

17. An arc welder according to claim 16, wherein said setting circuit means includes a welding current setting means, arc voltage setting means, and switching means for selectively enabling a setting of an individual or union control mode.

18. An arc welder according to claim 4, further comprising means for sensing the diameter of said wire electrode and providing an output to said computer whereby control of said SCR circuit means is effected in accordance therewith.

* * * * *